United States Patent [19]
Hoshihara

[11] Patent Number: 5,232,264
[45] Date of Patent: Aug. 3, 1993

[54] VEHICLE SEAT

[75] Inventor: Naoaki Hoshihara, Nagoya, Japan

[73] Assignee: Aisin Seiki Kabushiki Kaisha, Kariya, Japan

[21] Appl. No.: 797,015

[22] Filed: Nov. 25, 1991

[30] Foreign Application Priority Data

Nov. 30, 1990 [JP] Japan ................................ 2-330292

[51] Int. Cl.⁵ .............................................. A47C 1/02
[52] U.S. Cl. .................................. 297/344; 297/346; 297/330
[58] Field of Search ............... 297/320, 321, 322, 330, 297/344, 346, 347, 348, 284.1, 284.11, 284.3, 361, 391

[56] References Cited

U.S. PATENT DOCUMENTS

| | | | |
|---|---|---|---|
| 4,401,343 | 8/1983 | Schmidt | 297/284.1 |
| 4,505,514 | 3/1985 | Stöckl et al. | 297/322 |
| 4,759,587 | 7/1988 | Bucka | 297/361 |
| 4,773,703 | 9/1988 | Krügener et al. | 297/284.1 |

FOREIGN PATENT DOCUMENTS 62-20047 5/1987 Japan.
1-42853 9/1989 Japan.

Primary Examiner—Laurie K. Cranmer
Attorney, Agent, or Firm—Finnegan, Henderson, Farabow, Garrett and Dunner

[57] ABSTRACT

A vehicle seat having seat cushion portion and seat back portion comprises a main frame including main back frame for the seat back portion and a main cushion frame for the seat cushion portion connected to the main back frame, a sub frame including sub back frame for the seat back portion and sub cushion frame for the seat cushion portion pivotally connected to the sub back frame, the sub frame having a seat cover on which an occupant of the seat sits. The vehicle seat further includes a raising and lowering device provided at the main frame and operatively connected to the sub frame to raise or lower the sub frame with respect to the main frame secured to vehicle body so that the position of main frame may be unchanged even when the position of the sub frame is adjusted for the proper position of the occupant of the seat.

10 Claims, 4 Drawing Sheets

VEHICLE SEAT

BACKGROUND OF THE INVENTION

1. Field of the Invention

This invention relates to a vehicle seat and more particularly to a vehicle seat for automobiles.

2. Description of the Related Art

A conventional vehicle seat is disclosed in Japanese Patent Publication No. 62-20047. In this publication, in order to adjust the seat height for an occupant of the seat to his or her proper visible position, seat cushion portion of a vehicle seat is raised or lowered by a motor independently of the seat back portion of the seat.

In this type of seat, however, only the seat cushion portion is raised or lowered, keeping the seat back portion to the fixed position, and accordingly the occupant may feel uncomfortable because of his or her waist or heat portion being unfitted to the proper position of the seat back portion. Further, if the seat cushion portion is raised high, some space is created between the seat cushion and back portions, which may be another design problem in appearance. In order to obviate the drawbacks of the above conventional seat, another Japanese Patent Publication No. 1(1989)-42853 discloses a seat having a seat cushion and a seat back portion being made in one piece. This type can solve the uncomfortableness but the seat height adjusting structure of this type should be strengthened in order to support the load received from the occupant in case of collision accident.

SUMMARY OF THE INVENTION

Accordingly it is an object of the present invention to provide an improved vehicle seat having a seat height adjusting mechanism.

According to the present invention, a vehicle seat includes a main frame including main back frame for the seat back portion and a main cushion frame for the seat cushion portion connected to the main back frame, a sub frame including sub back frame for the seat back portion and sub cushion frame for the seat cushion portion pivotally connected to the sub back frame, the sub frame having a seat cover on which an occupant of the seat sits and a raising and lowering device provided at the main frame and operatively connected to the sub frame to raise or lower the sub frame with respect to the main frame secured to vehicle body.

BRIEF DESCRIPTION OF THE DRAWINGS

A more complete appreciation of the invention and many advantages thereof will be readily obtained as the same becomes better understood by reference to the following detailed description when considered in connection with the attached drawings, wherein.

DETAILED DESCRIPTION OF THE PREFERRED EMBODIMENTS

Figure 1:
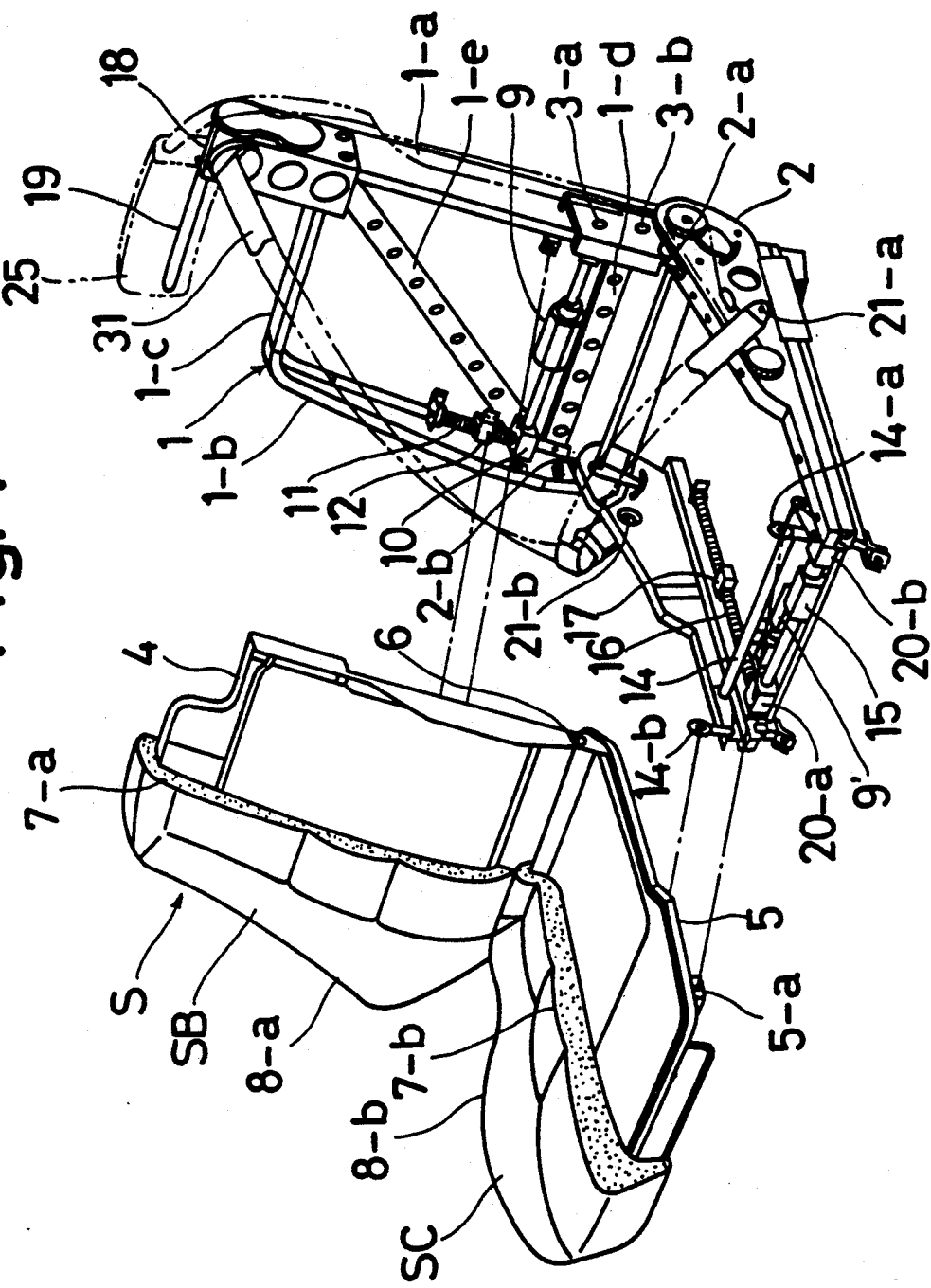
FIG. 1 is a perspective but partially exploded view of a vehicle seat according to the embodiment of the present invention.
Figure 2:
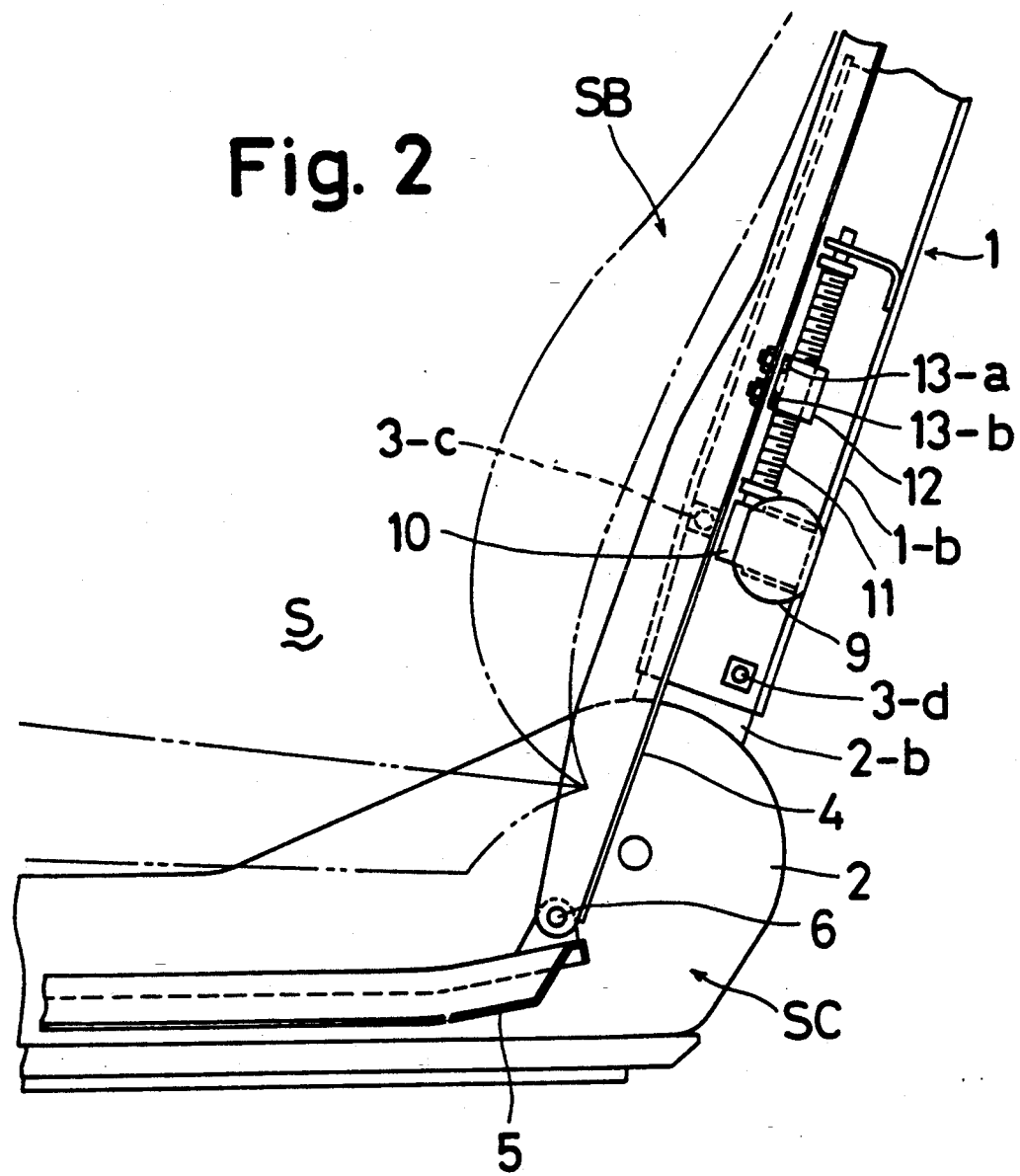
FIG. 2 is a side view of the vehicle seat of FIG. 1 but showing detail of raising and lowering mechanism thereof.

Referring now to FIGS. 1 and 2 wherein a vehicle seat of the first embodiment of the invention is shown. The vehicle seat S includes a seat back portion SB and seat cushion portion SC. Frames of the seat includes a main frame having main back frame 1 and adjuster frame 2 and subs frame having sub back frame 4 and cushion frame 5.

The main back frame includes two side members 1-a and 1-b, upper and lower members 1-c and 1-d and a reinforcement member 1-e. The adjuster frame 2 includes two upper arms 2-a and 2-b which are secured to the side members 1-a and 1-b of the main back frame 1 by bolts 3-a, 3-b, and 3-d (see FIGS. 1 and 2) to form the main back frame.

The adjuster frame 2 includes a seat reclining device for reclining the main back frame 1 with respect to the adjuster frame 2.

The sub back frame 4 and cushion frame 5 are rotatably connected to each other by shaft 6 to form the sub frame which also includes Urethan pads 7-a for seat back portion SB and 7-b for the seat such portion SC and covered by members 8-a and 8-b for the occupant of the seat.

Rear raising and lowering structure is located in the main back frame 1 and comprises of motor 9, gear housing 10 screws 11 and nut members 12. When the motor 9 is driven, the driving force is transmitted to the screws 11 via reduction gears in the housing 10 to raise or lower the nut members 12. It should be noted that the gear housing, screws and nut members are provided each at both sides of the main back frame 1 but only one of each is shown in the drawings.

Since the sub back frame 4 is secured to the nut members 12 by bolts 13-a and 13-b as clearly shown in FIG. 2, the rear side of the seat is raised or lowered in accordance with the movement of the nut members 12.

Front raising and lowering structure is located in the adjuster frame 2 and comprised of link member 14 and motor 9'. When the front portion of the seat cushion is desired to be raised or lowered, the driving force from the motor 9' is transmitted to the link ends 14-a and 14-b which are pivotally connected to the cushion frame 5 at portions 5-a and thus the front portion of the seat cushion SC is raised or lowered.

Seat slide device includes a motor 15, gear housing 20-a and 20-b, screws 16 and nut members 17. The nut members 17 are secured to the guide rails to move the seat in front and rear directions in a conventional manner.

A seat belt retractor 18 is provided on the upper portion of the main seat back frame 1. Numeral 19 designates a head rest frame on which a head rest 25 is mounted. Seat belt 31 is provided one end in the retractor 18 and the other end at both sides of the adjuster frame 2 at the securing points 21-a and 21-b.

Figure 3:
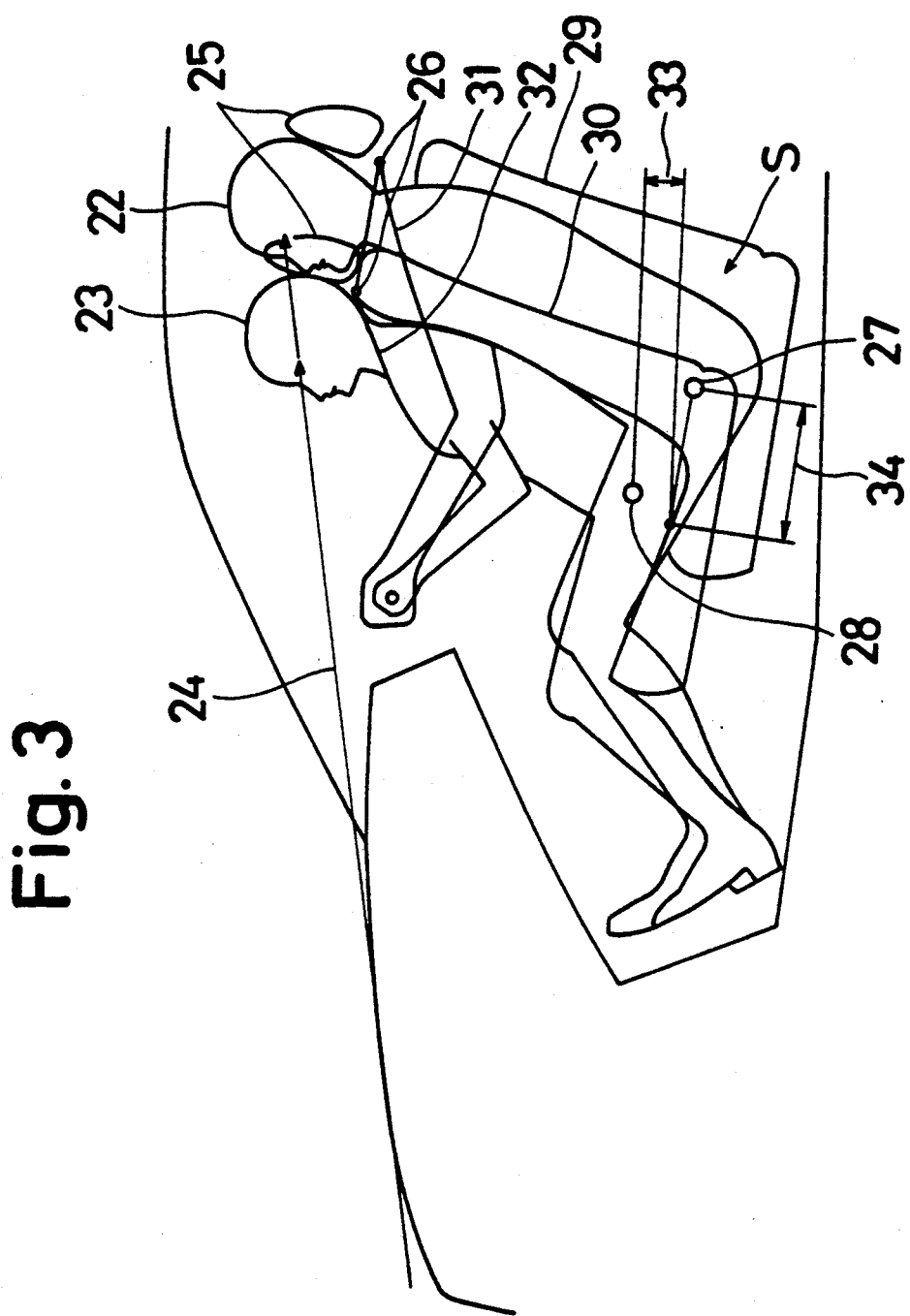
FIG. 3 is a view showing the changes of the seat position according to the occupants.

Referring now to FIG. 3, in an automobile, the seat S according to the present invention is installed. Numerals 22 and 23 designates seat occupants of different sizes. According to the present invention, even the different size occupants are seated, both occupants can obtain the same proper visible position to adequately see the front area of the automobile (line 24 of FIG. 3) after they adjusted the height of their seat positions.

In this drawing, the positions of head rest 25 and anchor point 26 of seat belts 31 and 32 are unchanged even if the seat height is changed. Accordingly, there is no need for changing the positions of the head rest or seat belt even after the occupant has adjusted the height of the seat.

Numerals 27 and 28 designate the hip position of the respective occupants 22 and 23. Similarly, numeral 29 and 30 designate seated positions of respective occupants 22 and 23. Numerals 33 and 34 designate strokes of vertical change and horizontal movements.

Upon collision accident, the load from the occupant is transmitted to the seat or seat belt then transmitted to the main frame comprising of main back frame 1 and adjuster frame 2 and finally to the vehicle body. The very little load will be transmitted to the sub frame comprising of sub back frame 4 and cushion frame 5.

Figure 4:
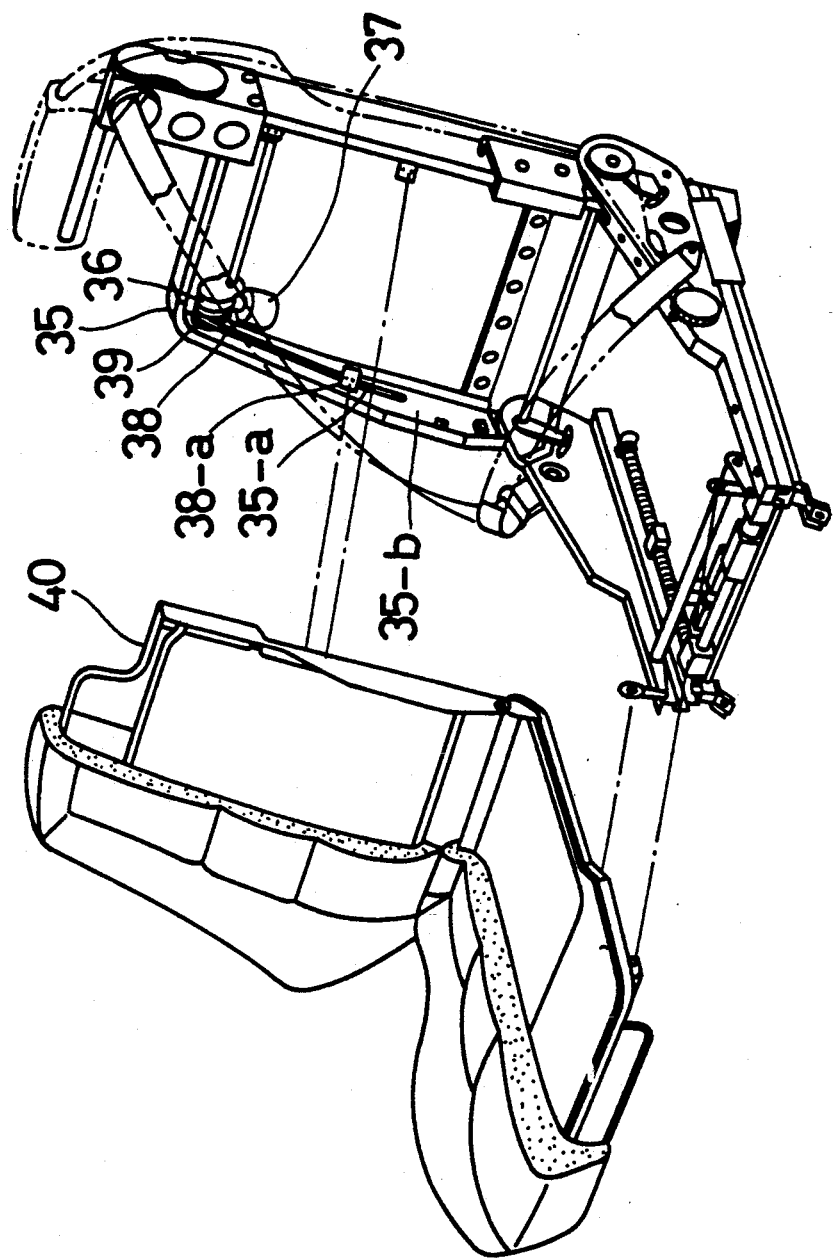
FIG. 4 is a perspective but partially exploded view of a vehicle seat according to another embodiment of the present invention.

Referring now to FIG. 4 wherein a seat structure of another embodiment of the present invention is shown. In this embodiment, main back frame 35 includes a rear raising and lowering structure having a motor 37, gear housing 36, a drum 39, wire 38 attached to the drum 39 at one end and guided at the other end 38-a by an elongated slot 35-a provided on the side member 35-b and engaged with the sub back frame 40. When the motor 37 is driven, the wire is moved upward or downward guided by the drum 39 and the elongated slot 35-a to raise or lower the sub back frame 40.

The seat of the embodiments explained have seat belts installed in the seat structure but the invention is not limited to such structure and can be applied to any vehicle without seat belt.

According to the present invention, height of seat back and seat cushion are adjusted as a unit and therefore the problems in the conventional seats can be solved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle seat having a seat cushion portion and a seat back portion comprising:
   a main frame secured to a vehicle body, said main frame including a main back frame for the seat back portion and a main cushion frame connected to the main back frame for the seat cushion portion;
   a sub frame including a sub back frame for the seat back portion and a sub cushion frame for the seat cushion portion, said sub cushion frame being pivotally connected to the sub back frame, the sub frame having a seat cover on which an occupant of the seat sits;
   a raising and lowering device provided at the main frame and operatively connected to the sub frame to raise and lower the sub frame relative to the main frame.

2. A vehicle seat according to claim 1, wherein the raising and lowering device includes drive means and connecting means movable between upper and lower positions by the driving force from the drive means and operatively connected to the sub frame to move the sub frame in upward and downward directions.

3. A vehicle seat according to claim 2, wherein the raising and lowering device is secured to the main back frame and wherein the connecting means includes at least one screw, and nut secured to the screw to move between the upper and lower positions in accordance with the driving force of the drive means.

4. A vehicle seat according to claim 3, wherein the raising and lowering device further includes a link means, provided at the main cushion frame and operatively connected to a front portion of the sub cushion frame of the sub frame, for raising and lowering the front portion of the sub cushion frame, said raising and lowering pivoting the sub cushion frame relative to the sub back frame.

5. A vehicle seat according to claim 4, wherein the drive means is a motor and reduction gears for rotating the screw.

6. A vehicle seat according to claim 5, wherein the main frame is secured to the vehicle floor and further includes a seat slide means for sliding the main cushion frame in front and rear directions with respect to the vehicle.

7. A vehicle seat according to claim 6, further comprising a head rest secured to the main back frame.

8. A vehicle seat according to claim 7, further comprising a seat belt assembly secured to the main frame.

9. A vehicle seat according to claim 7, further comprising an adjuster frame mounted to the main cushion frame; and a seat reclining device attached to the adjuster frame for reclining the main back frame with respect to the main cushion frame.

10. A vehicle seat according to claim 2, wherein the drive means is a motor and the connecting means includes wire means driven by the motor for moving in upward and downward directions, the wire means being operatively connected to the sub back frame of the sub frame.

* * * * *